United States Patent
Roellgen

(10) Patent No.: US 7,631,109 B2
(45) Date of Patent: Dec. 8, 2009

(54) AUTOMATIC CONFIGURATION OF LOCAL AREA NETWORK

(76) Inventor: Bernd Roellgen, 85 Josephsburg Str., Munich, Bavaria (DE) 81673

( * ) Notice: Subject to any disclaimer, the term of this patent is extended or adjusted under 35 U.S.C. 154(b) by 233 days.

(21) Appl. No.: 11/312,293

(22) Filed: Dec. 19, 2005

(65) Prior Publication Data

US 2006/0173979 A1    Aug. 3, 2006

(30) Foreign Application Priority Data

Dec. 28, 2004    (DE) ....................... 10 2004 062 967

(51) Int. Cl.
*G06F 3/00* (2006.01)
*G06F 15/177* (2006.01)
*G06F 17/30* (2006.01)
*H04L 29/06* (2006.01)
*H04L 12/24* (2006.01)
*G06F 9/00* (2006.01)

(52) U.S. Cl. .................... 710/8; 709/220; 709/221; 709/223; 709/224; 709/225; 710/2; 713/153; 713/154; 713/189; 726/11; 726/26; 726/27

(58) Field of Classification Search .................. 710/2
See application file for complete search history.

(56) References Cited

U.S. PATENT DOCUMENTS

| | | | | |
|---|---|---|---|---|
| 6,059,842 A | * | 5/2000 | Dumarot et al. ............. | 717/153 |
| 6,704,864 B1 | * | 3/2004 | Philyaw ........................ | 713/1 |
| 6,763,454 B2 | * | 7/2004 | Wilson et al. ................. | 713/1 |
| 7,055,107 B1 | * | 5/2006 | Rappaport et al. .......... | 715/848 |
| 7,120,652 B2 | * | 10/2006 | Maslowski ................... | 707/203 |
| 2004/0249907 A1 | * | 12/2004 | Brubacher et al. .......... | 709/220 |

* cited by examiner

*Primary Examiner*—Henry W. H. Tsai
*Assistant Examiner*—Michael Sun

(57) ABSTRACT

The Method provided is for the optimal configuration of devices in a computer network by a computer program, where optimal settings of any device may be interdependent on settings of any other, or all other devices in the network The method renders fully automatic management of all devices in a Local Area Network (LAN) possible. Internet Service Providers and Original Equipment Manufacturers will be able to deliver products that configure themselves automatically. The invention regards a method to configure devices in a computer network which is executed by a computer program that makes the following steps: Query current settings of one or more devices in the network by using HTTP, FTP, Telnet or a comparable standard protocol. Determine optimum settings with the aid of a data base. Transfer of the previously determined optimum settings to configurable devices in the network. The new settings are being stored on the configurable devices in the network.

7 Claims, 1 Drawing Sheet

Schematic Diagram of Invention.

Figure 1. Schematic Diagram of Invention.
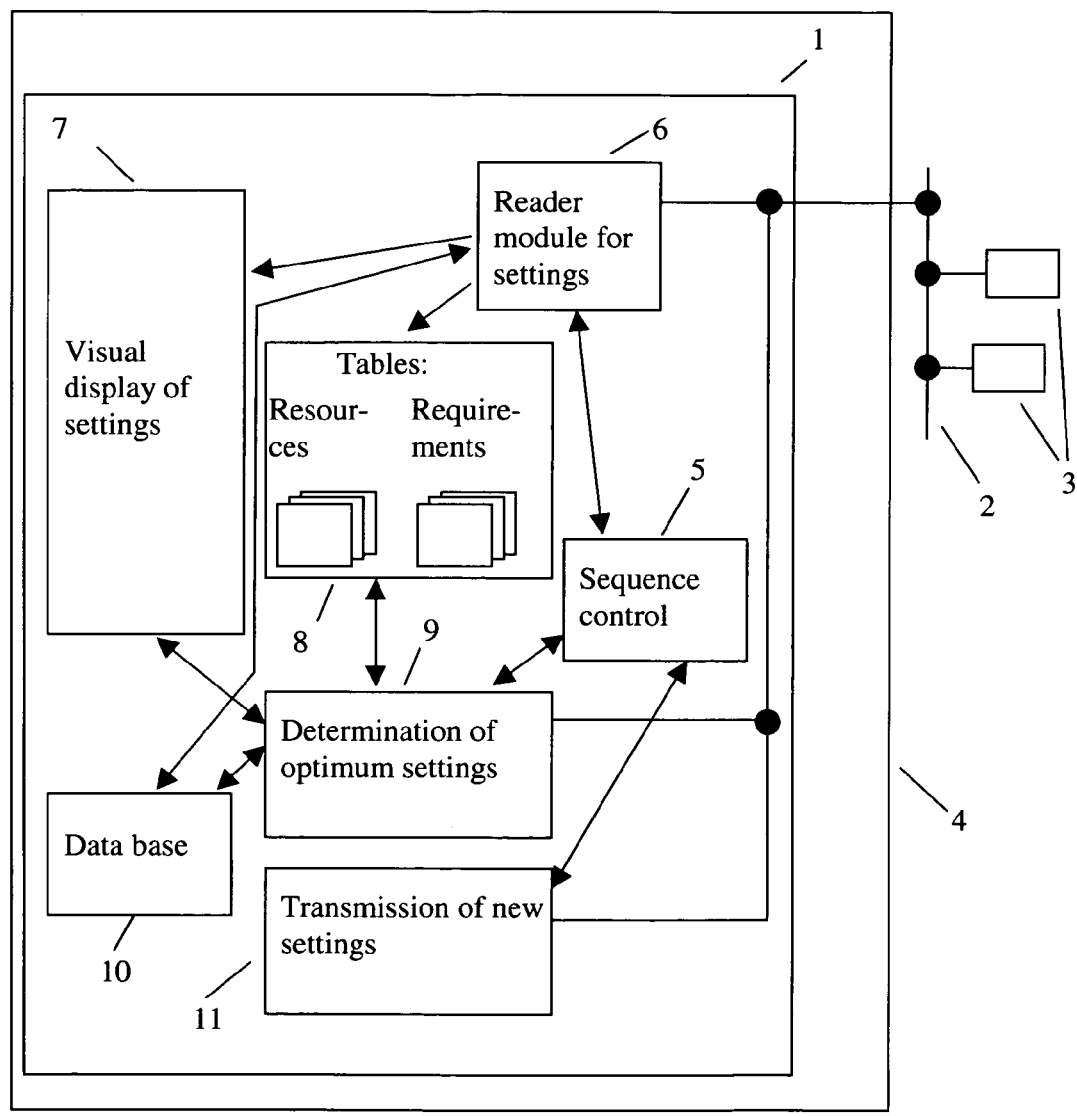

AUTOMATIC CONFIGURATION OF LOCAL AREA NETWORK

CROSS-REFERENCE TO RELATED APPLICATIONS

Not Applicable.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC

Not Applicable.

BACKGROUND OF THE INVENTION

The Invention relates to the automatic optimization and configuration of devices in a Local Area Network(LAN) by computer program.

Many new technologies have the opportunity to affect the expansion of the home network. IP Phones, IP TV, IP Radio, Gaming Systems, Video Phones, Video Messaging, and Chatting: These combined with the increased efficiency achieved by networking different home computers together along with printers scanners and other devices can make the household Local Area Network a powerful machine.

The limiting factor in the expansion of this technology into the household is the inability of the average computer user to setup and manage the complex settings of such interdependent devices. It is this problem that the invention addresses.

Devices in a network include network routers, modems and other configurable network components, as well as communication end devices that feature a network interface (Computers, IP Telephones, Printers, etc.)

Optimized settings are determined from user input, settings that already exist in network devices, and from alternative parameters that are generated by the method that, if not set, would result in conflicting or inefficient settings.

Methods for the configuration of devices in a computer network by using standard protocols are known and widespread. Settings of Network routers, IP telephones and other network devices can generally be configured ergonomically via HTTP, FTP, Telnet or another standard protocol.

As an example the user thereby sets the network address of a device in the network with a web browser (a program that can display HTML pages, e.g. Microsoft Internet Explorer and Netscape Navigator).

The device in the network subsequently sends an HTML page that contains current settings. The user can enter changes into input fields that are provided in the window of the web browser that displays the settings in a way that is readable by humans.

Finally are the new settings transmitted back to the device in the network when the user hits a button that is provided in the HTML page displayed by the web browser e.g. through the http POST command. In succession, the device in the network reads, interprets and activates the new settings and stores them locally.

Besides the http protocol, also ftp, telnet and tftp are known. Some of these protocols differ greatly in the modus operandi that the user must follow in order to change settings.

Also known are electromechanical switches like for example DIP switches. With such electromechanical components, there is no software based procedure to make settings possible, which would implicate that the user gets no explanations on a screen. It is also impossible to detect colliding or contradicting combinations of settings.

Well-known methods for the configuration of devices in a computer network exhibit the disadvantage that each device in a computer network can only be configured alone or that only a group of devices with the same functionality and from only one manufacturer can be configured at once.

As a matter of consequence, the probability for resources being used two times or that data, in contrast to the expectation of the user, gets blocked instead of reaching the target device. This is often caused by contradictory settings of the devices in a network.

As an example, a firewall (a barrier between two networks that must be surmounted in order to access the respectively opposite network) can close data channels in a TCP/IP network called 'ports' and thus interfere heavily with the functionality of an IP telephone. Users or network administrators are consequently forced to localize the reason for the malfunction of the IP telephone and to correct the error by selecting non-contradicting settings for a number of independent devices in a network.

BRIEF SUMMARY OF THE INVENTION

The Method provided is for the analysis and configuration of devices in a computer network by a computer program. The method renders fully automatic management of all devices in a Local Area Network(LAN) possible. Internet Service Providers and Original Equipment Manufactures will be able to deliver products that configure themselves automatically.

The invention regards a method to configure devices in a computer network which is executed by a computer program that makes the following steps: Query current settings of one or more devices in the network by using HTTP, FTP, Telnet or a comparable standard protocol, Determine optimum settings with the aid of a data base, Transfer of the previously determined optimum settings to configurable devices in the network. The new settings are being stored on the configurable devices in the network.

BRIEF DESCRIPTION OF DRAWINGS

FIG. 1 is the schematic representation of an embodiment of a method for the configuration of devices in a computer network.

DETAILED DESCRIPTION OF INVENTION

The invention underlies the problem of a method for the configuration of devices in a computer network by a computer program with:
- a computer program that can execute the method on a device that is part of the computer network
- a minimum of two devices in the network are automatically recognized by the computer program and current settings are read by using a standard network protocol
- depending on physical and logical features of the devices that have been recognized by the computer program, non-colliding and non-contradicting settings are determined with the help of a data base optimized settings are transmitted to one or more of the recognized devices through the use of a standard network protocol and there the settings are stored temporarily and/or permanently.

Through this, the previously described disadvantages do not occur.

A method for the configuration of devices in a computer network by a computer program that is according to the invention first tries to establish contact with devices in the network via http, ftp, Telnet and/or another standard protocol.

For this purpose, the TCP/IP network address is preferably used as basis in order to try to establish contact with as many devices in the network as possible.

As an example can a computer with the network address 192.168.0.254 and a subnet mask 255.255.255.0 communicate with maximum 253 other devices in the network. Only the network addresses 192.168.0.1. 192.168.0.254 can be addressed in a TCP/IP network. Establishing contact can run almost simultaneously by starting 253 virtually parallel running threads.

Devices in a network normally answer to an appropriate request by replying with an HTML page that is typical for the particular device, which usually contains a demand to send credentials and which also usually contains manufacturer and type designation information as plaintext.

Provided that the computer program can find the device in the system, corresponding information about the recognized device in the data base that is associated with the computer program, and the required credentials are available, is the computer program able to read in all settings. For this, it merely executes the same steps as a human would have to make.

Subsequent to reading the settings of all network devices that are in reach and that are recognizable, the computer program determines, depending on the functionalities of all recognized devices, a configuration for all recognized devices in the network that exhibits the lowest total number of collisions and contradictions.

A table that contains all provided resources and requirements for each recognized device is available.

As an example, a network router with integrated firewall may provide a DHCP server as a resource. The DHCP server can provide network addresses automatically inside of the local area network. Furthermore assures the integrated firewall that requests from outside of the local area network can only pass through unlocked ports into the LAN. For this network router, the resources 'DHCP-Server' and 'Ports' need consequently to be entered into the table in the computer program.

A resource of an IP telephone is e.g. the provision that the phone can lease IP addresses from a DHCP server, or it can as well be configured to have a fixed IP address. Another resource can be the ability to translate IP addresses.

On the other side contains the list of requirements of the IP phone the need for certain ports to be open and that the IP address of the telephony service provider is correctly specified.

On the basis of the requirements of the IP phone, the computer program can open ports in the router with an integrated firewall and it can additionally configure both router with integrated firewall and IP phone for DHCP usage.

The choice for the respectively better settings is made depending on known preferences and the number of collisions and contradictions. The use of DHCP could e.g. be a preference for a local area network.

To keep all port locked can as well be a preferred setting. Although, an IP phone requires a number of ports to be open.

Collisions between router with integrated firewall and an IP phone are easily determined by comparing overlapping parts of the tables and can be removed by opening the ports that are required by the IP phone.

After the computer program, having finished comparing tables and making all possible adjustments, a method that is in accordance with the invention, sends the settings that have been found, back to the devices in the network.

These settings are activated and stored locally in these devices.

Potentially unresolved contradictions are displayed to the user on the screen of the computer.

As an example, an IP phone cannot fulfill it's function if certain ports have not been opened. If these ports cannot be opened, this contradiction cannot be resolved and this should therefore be displayed to the user.

The major advantage of a method for the configuration of devices in a computer network by a computer program that is in accordance to the invention is that users can configure devices in a network as far as possible without the need to act.

These devices can originate from different manufacturers and/or can otherwise only be configured by experts without causing contradictions and collisions. Through this, decisive ergonomically advantages result for users and financial advantages result for vendors of network devices that can be configured in accordance with the invention.

Vendors of network devices that can be configured in accordance with the invention need fewer personnel for providing installation service to users. The result is a competitive advantage.

It is eluded that a device in a network can as well be internet telephony software that communicates through the local area network with and/or via other devices in the local area network. Such communication software can be executed on the same computer as the method. In this case, settings can additionally or alternatively to standard network protocols be accessed by reading or writing of initialization files or entries in the registry of the operating system.

A method for the configuration of devices in a computer network by a computer program that is in accordance with the invention can additionally be used to configure network services automatically.

That way the computer program can automatically subscribe to one or more network services with an internet service provider and it can make the corresponding changes to the settings to one or more devices in the network according to the resources and the requirements of the services that is subscribed to.

This functionality can be reasonable and wanted, depending on the preferences of the user, especially for the subscription of services that are free of charge.

Also reasonable is the simultaneous subscription to competing services, if this is wanted by the user. As an example, it is possible to configure one IP telephony provider for long distance calls and one for regional calls on demand if a cost advantage, better voice quality or other advantages for the user result.

DETAILED DESCRIPTION OF DRAWINGS

The schematic diagram (FIG. 1) represents a method for the configuration of devices in a computer network that is labelled with the reference sign 1.

Method 1, that is executed on a computer (4) features a sequence control (5), that initially makes the reader module for settings (6) search devices (3) and (4) in the network (2).

This is performed in an advantageous design by using http, ftp, telnet and/or other standard protocols for networks. For this purpose is preferentially the address of the computer (4) in the network (2) taken as base and establishment of communication to devices (3) in the network (2) is attempted in parallel on as many IP addresses as possible.

Establishment of communication can be carried out virtually simultaneously by the method (1) which starts several threads running in parallel.

Devices (3) in a network (2) are requested in an especially advantageous way to reply through the http protocol by sending back an HTML page that is typical for the particular device. This reply contains manufacturer and type identification in plaintext and in most cases the request to post credentials.

If the reader module for settings (6) can find information in the data base (10) for the recognized devices (3) or (4) and if the necessary password data is available, the reader module for settings (6) can automatically read all settings via one or more standard protocols.

It additionally allocates memory in the computer (4) and saves this data in a table (8) with resources of device (3) or (4) and in a table (8) with requirements of the device. In an advantageous design, recognized settings are displayed by the Visual display of settings function block (7) and the user gets the possibility to change settings manually.

The sequence control (5) calls the software module 'determination of optimum settings' (9) after the successful recognition of device (3) and/or (4).

Based on data that is stored in the tables (8), a method that is according to the invention determines optimum settings for the detected devices (3) and/or (4) by assigning requirements of a device (3) or (4) to a resource of the same device or a another device (3) or (4).

This fulfils the requirements of a device (3) or (4) and thus, contradicting and colliding settings are removed step by step for all detected devices (3) and (4).

The software module "determination of optimum settings" (9) further assigns to all recognized devices (3) and (4) unique network addresses and ports. Instead of assigning static network addresses, DHCP can be configured, if a DHCP server is available in the network.

Furthermore can communication devices like IP phones be configured with account data for new as well as for existing accounts.

Finally are the optimum settings displayed by the software module "Visual display of settings" (7) and the Sequence control (5) receives again control over the process.

The module Sequence control (5) takes a final step and calls the module Transmission of new settings (11).

This module operates according to the same principle as the Reader module for settings (6), but only already detected devices (3) and (4) are contacted by using a standard protocol and the new settings are transmitted, activated and stored locally in these devices.

In case that the Reader module for settings (6) cannot find any or insufficient information about devices (3) or (4) in the Data base (10), an advantageous design of a method (1) that is according to the invention provides for the transmission of the discovered data via internet to the licensor of the method (1), if this is wanted by the user.

Thereby it is possible that future versions of the method (1) can detect devices (3) or (4) automatically in the data base (10) and it is further possible to give support from one or more remote locations.

The invention claimed is:

1. A method for optimizing network device settings for a computer connected to a computer network, the method comprising the steps of:
    scanning for network devices connected to the computer through the computer network;
    retrieving network device settings from the scanned network devices that are required for enablement of the scanned network devices to function;
    storing said network device settings into a database;
    analyzing said network device settings by comparing said device settings with other network device settings for at least one other network device stored in the database for interdependencies and conflicting settings, including checking for firewall settings and port settings;
    determining optimization settings of said network device settings by indicating elimination of said conflicting settings, wherein elimination of said conflicting settings involves changing firewall or port settings to unblock communication paths necessary for said network devices to operate;
    sending requests to change network device settings of said network device connected to the computer through the computer network to the optimized settings determined in the steps of determining optimization settings.

2. The method for optimizing network device settings as recited in claim 1, wherein the computer network utilizes http, ftp, or telnet standard protocols individually or in combination for communication between the computer and network devices.

3. The method for optimizing network device settings as recited in claim 1, wherein the database can be updated or extended by reading data from a locally accessible storage device or from the Internet.

4. The method for optimizing network device settings as recited in claim 1, further comprising displaying settings that have been read and optimized settings to a visual display device.

5. The method for optimizing network device settings as recited in claim 1, further comprising terminating the optimizing step when user interaction or a technical problem occurs.

6. The method for optimizing network device settings as recited in claim 1, further comprising that a network device in the computer network can be a device residing on the computer, wherein the device reads and writes back settings communicated to standard network protocols by reading and writing setting from and to initialization files or entries in the registry of the operating system.

7. The method for optimizing network device settings as recited in claim 1, further comprising that the network devices in the computer network are communication end devices which can be devices from different servers or different communication services, and can be automatically configured using a settings database on a local storage device or by retrieving settings from the Internet.

* * * * *